(12) United States Patent
Soon-Shiong et al.

(10) Patent No.: US 12,494,816 B1
(45) Date of Patent: Dec. 9, 2025

(54) SIXTY GIGAHERTZ WIRELESS COMMUNICATION SYSTEMS

(71) Applicant: Tensorcom, LLC, Culver City, CA (US)

(72) Inventors: Patrick Soon-Shiong, Los Angeles, CA (US); Zaw Soe, Culver City, CA (US)

(73) Assignee: Tensorcom, LLC, Culver City, CA (US)

(*) Notice: Subject to any disclaimer, the term of this patent is extended or adjusted under 35 U.S.C. 154(b) by 0 days.

(21) Appl. No.: 18/982,810

(22) Filed: Dec. 16, 2024

Related U.S. Application Data

(60) Provisional application No. 63/672,986, filed on Jul. 18, 2024.

(51) Int. Cl.
| | | |
|---|---|---|
| H04B 7/06 | (2006.01) | |
| H01Q 21/06 | (2006.01) | |
| H04B 1/40 | (2015.01) | |
| H04W 74/0816 | (2024.01) | |

(52) U.S. Cl.
CPC .............. *H04B 1/40* (2013.01); *H01Q 21/06* (2013.01); *H04B 7/0617* (2013.01); *H04W 74/0816* (2013.01)

(58) Field of Classification Search
CPC ........ H04B 1/40; H04B 7/0617; H01Q 21/06; H04W 74/0816
See application file for complete search history.

(56) References Cited

U.S. PATENT DOCUMENTS

| | | | | |
|---|---|---|---|---|
| 11,234,163 | B1* | 1/2022 | Ho | H04W 28/06 |
| 11,290,169 | B2* | 3/2022 | Trojer | H04B 7/0456 |
| 2022/0121798 | A1* | 4/2022 | Lo | G06F 30/337 |
| 2022/0124663 | A1* | 4/2022 | Tsai | H04W 12/088 |
| 2023/0047867 | A1* | 2/2023 | Gundavelli | H04W 36/0085 |
| 2023/0108782 | A1* | 4/2023 | Kang | H04W 88/085 370/336 |
| 2024/0007148 | A1* | 1/2024 | Ellenbeck | H04B 7/06952 |
| 2024/0045820 | A1* | 2/2024 | Lai | G06F 13/382 |
| 2024/0214023 | A1* | 6/2024 | Wang | H04B 1/40 |
| 2024/0389018 | A1* | 11/2024 | Sung | H04W 88/08 |
| 2025/0007549 | A1* | 1/2025 | Khayatzadeh | H04B 1/16 |
| 2025/0047329 | A1* | 2/2025 | Rahman | H04B 7/0413 |
| 2025/0062801 | A1* | 2/2025 | Sohrabi | H04B 17/102 |
| 2025/0106135 | A1* | 3/2025 | Vaez-Ghaemi | H04L 41/22 |

* cited by examiner

*Primary Examiner* — Kenneth T Lam
(74) *Attorney, Agent, or Firm* — Harness, Dickey & Pierce, P.L.L.C

(57) ABSTRACT

An example communication system includes a distributed unit of a fronthaul communication system architecture, wherein the distributed unit is in communication with a core network of the communication system, a radio unit of the fronthaul communication system architecture, wherein the radio unit is electrically coupled with at least one cellular antenna, and the radio unit is configured to transmit and receive wireless cellular signals, and a wireless communication link between the distributed unit and the radio unit. The wireless communication link includes a first system-on-chip (SoC) device electrically coupled with the radio unit, and a second SoC device electrically coupled with the distributed unit, wherein the first SoC device and the second SoC device are configured to wirelessly transmit communication signals between the radio unit and the distributed unit at a frequency of at least sixty Gigahertz.

19 Claims, 6 Drawing Sheets

SIXTY GIGAHERTZ WIRELESS COMMUNICATION SYSTEMS

CROSS-REFERENCE TO RELATED APPLICATION

This application claims the benefit and priority of U.S. Provisional Application No. 63/672,986, filed on Jul. 18, 2024. The entire disclosure of the above application is herein incorporated by reference.

FIELD

The present disclosure relates systems and methods for sixty Gigahertz wireless communication.

BACKGROUND

Cellular infrastructure is evolving towards a denser network with higher capacity, necessitating the use of higher frequency bands. With the rise of 5G, open radio architecture plays a pivotal role in this transformation. Open Radio Access Networks (O-RAN) allow for more flexible, cost-effective, and innovative deployment of cellular networks by decoupling the multiple layers of signal and protocol processing. This decoupling is crucial as it enables operators to deploy radios from different vendors and integrate them seamlessly into their networks, fostering competition and innovation and enabling lower cost systems.

The background description provided here is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

In some example embodiments, a communication system includes a distributed unit of a fronthaul communication system architecture, wherein the distributed unit is in communication with a core network of the communication system, a radio unit of the fronthaul communication system architecture, wherein the radio unit is electrically coupled with at least one cellular antenna, and the radio unit is configured to transmit and receive wireless cellular signals, and a wireless communication link between the distributed unit and the radio unit. The wireless communication link includes a first system-on-chip (SoC) device electrically coupled with the radio unit, and a second SoC device electrically coupled with the distributed unit, wherein the first SoC device and the second SoC device are configured to wirelessly transmit communication signals between the radio unit and the distributed unit at a frequency of at least sixty Gigahertz.

In some examples, the wireless communication link includes an antenna array configured to transmit signals using beamforming. In some examples, the antenna array includes at least eight antenna elements. In some examples, the antenna array is configured to operate according to a multiple input, multiple output communication arrangement.

In some examples, the antenna array is configured to transmit signals between the radio unit and the distributed unit according to at least one of an IEEE 802.11ay communication protocol or an IEEE 802.11ad communication protocol.

In some examples, the wireless communication link is configured to transmit signals between the radio unit and the distributed unit with a latency of less than fifty microseconds.

In some examples, the wireless communication link is configured to transmit data at a rate of at least 25 Gbps. In some examples, the radio unit is configured to transmit and receive 5G cellular network signals. In some examples, the distributed unit is not connected with the radio unit via a physical wire connection.

In some examples, the communication system includes at least one fiber cable coupled between the distributed unit and the core network to transmit communication signals between the distributed unit and the core network.

In some examples, the wireless communication link is configured to transmit signals between the radio unit and the distributed unit using time-division multiple access (TDMA) and carrier sense multiple access collisional avoidance (CSMA/CD) communication protocols.

In some examples, the wireless communication link is configured to transmit signals between the radio unit and the distributed unit at a distance of at least one kilometer.

In some examples, the first SoC device is electrically coupled with the radio unit via a first enhanced common public radio interface (eCPRI), and the first SoC device is electrically coupled with the radio unit via a second eCPRI.

In some examples, the communication system includes a third SoC device electrically coupled with the radio unit, and a fourth SoC device electrically coupled with the distributed unit, wherein the third SoC device and the fourth SoC device are configured to wirelessly transmit communication signals between the radio unit and the distributed unit at a frequency of at least sixty Gigahertz.

In some examples, the first SoC device is electrically connected with four beamforming integrated circuits, and the second SoC device is electrically connected with four beamforming integrated circuits.

In some examples, the communication system includes a field-programmable gate array (FPGA) electrically connected as an interface between the first SoC device and the radio unit.

An example method of operating a communication system including a distributed unit of a fronthaul communication system architecture, and a radio unit of the fronthaul communication system architecture, wherein the radio unit electrically is coupled with at least one cellular antenna, includes receiving, by the radio unit, wireless cellular signals via the at least one cellular antenna, wirelessly transmitting, via a first system-on-chip (SoC) device electrically coupled with the radio unit, a communication signal at a frequency of at least sixty Gigahertz, and receiving, by a second SoC device electrically coupled with the distributed unit, the communication signal transmitted by the first SoC device.

In some examples, the communication signal is a first communication signal, and the method further includes wirelessly transmitting, via the second SoC device, a second communication signal at a frequency of at least sixty Gigahertz, and receiving, by the first SoC device, the second communication signal transmitted by the second SoC device.

In some examples, wireless transmitting the communication signal includes wireless transmitting the communication signal at a rate of at least 25 Gbps.

In some examples, the communication signal is a first communication signal, a third SoC device is electrically connected with the radio unit, a fourth SoC device electrically is connected with the distributed unit, and the method further includes wirelessly transmitting, via a third SoC device, a second communication signal at a frequency of at least sixty Gigahertz, and receiving, by the fourth SoC device, the second communication signal transmitted by the third SoC device.

Further areas of applicability of the present disclosure will become apparent from the detailed description, the claims, and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings.

In the drawings, reference numbers may be reused to identify similar and/or identical elements.

DETAILED DESCRIPTION

Figure 1:
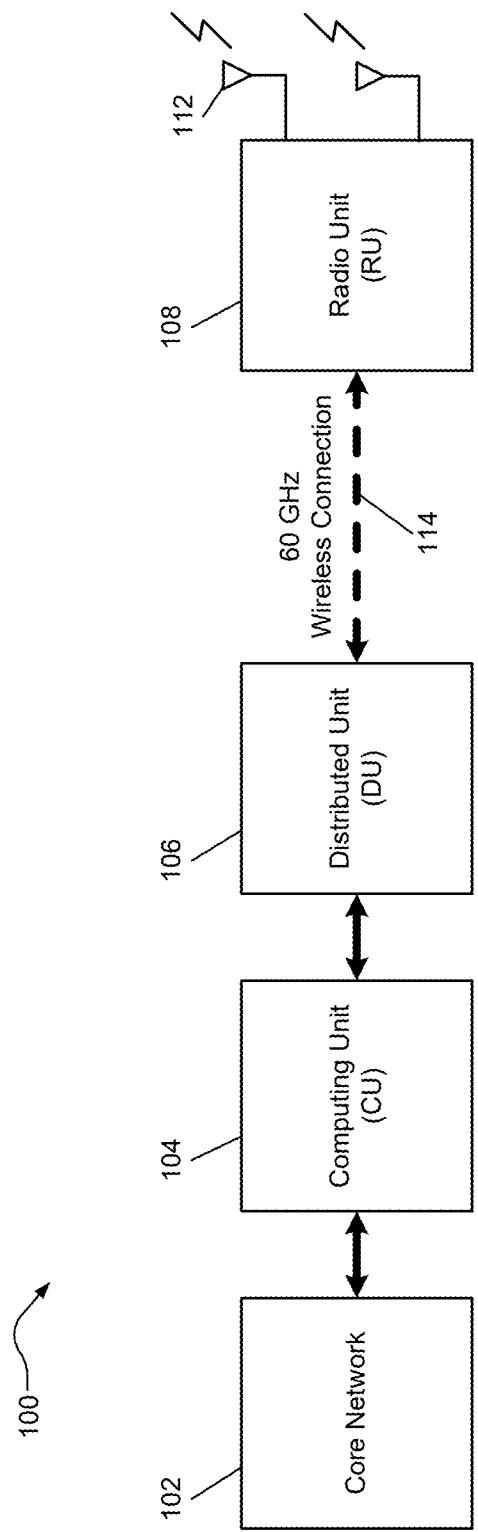
FIG. 1 is a functional block diagram of an example communication system including a 60 GHz wireless fronthaul.

Some example embodiments described herein include a 60 GHz wireless communication system which may leverage integrated circuits (ICs) fabricated with silicon technology. The communication systems provide high-throughput, reliable fronthaul transmissions, which may reduce or eliminate the need for fiber installation. The 60 GHz wireless link may target a data throughput of 25 Gbps (or higher or lower)), low latency, and high reliability, even under challenging environmental conditions. This approach provides a compelling alternative to traditional fiber-based fronthaul links, thereby reducing or eliminating the need for extensive trenching and fiber installation requirements.

Some example embodiments enable high throughput and extended link distance, which may include improvements such as increasing data throughput to 25 Gbps (or higher) with a link margin that ensures consistent performance under various weather conditions, and meeting a critical latency requirement of 50 microseconds (or more or less) between the radio unit (RU) and distributed unit (DU). The upgrades may include transitioning from a 40 nm IC implementation to an advanced 12 nm System-on-Chip (SoC). This upgrade may improve both data throughput and link range by more than 10×, by extending the beamforming from 32 elements to 128 elements (or more ore less), and enabling additional frequency bands (e.g., two additional frequency bands), thereby doubling or more the total operational bandwidth from 4 GHz to 8 GHz (or higher or lower).

Some example approaches described herein may facilitate 5G cell installations without extensive fiber deployment, especially in new installations. Wireless links may be set up within days, if not hours, significantly reducing deployment time and costs, as they may only require radio unit installations and minimal physical infrastructure. In some cases, wireless links may be the only viable option due to site limitations. Also, operating in the 60 GHz band may not require a spectrum license, thereby allowing for quicker deployment without the need for an FCC spectrum use permit.

Example 60 GHz wireless fronthaul capability may facilitate game-changer developments for 5G deployments, especially in urban installations. By allowing deployment without costly cabling, operators will be able to deploy more quickly, and in more locations. As 5G technology advances, this capability will play a significant role as cell sizes get smaller with higher capacity. For example, high throughput 60 GHz wireless solutions, without the need for a spectral license, may significantly contribute to scaling 5G deployment and beyond.

Cellular infrastructure is evolving towards a denser network with higher capacity, necessitating the use of higher frequency bands. With the rise of 5G, open radio architecture plays a pivotal role in this transformation. Open Radio Access Networks (O-RAN) allow for more flexible, cost-effective, and innovative deployment of cellular networks by decoupling the multiple layers of signal and protocol processing. This decoupling is crucial as it enables operators to deploy radios from different vendors and integrate them seamlessly into their networks, fostering competition and innovation and enabling lower cost systems.

As more installations require deploying cellular radios in locations that are not pre-wired, it is crucial for the system architecture to support flexible installation locations. One of the significant challenges in network installation is cabling, which can be costly and significantly limit installation options. Wireless fronthaul, such as the example communication systems described herein, may become a significant enabler to create higher capacity, denser networks, leading to new immersive user applications. Removing spatial limitations allows installations to take place in optimal locations for system capacity and operation, rather than compromised performance due to non-ideal installation sites.

Traditionally, high-throughput equipment in the millimeter-wave spectrum has been both expensive and bulky due to the need for large antennas for high gain. Achieving a wireless transmission system capable of 25 Gbps, for example, presents several challenges. Meeting requirements for 25 Gbps throughput (or higher or lower) under various environmental conditions remains a significant task. Incremental and extensive testing of example 60 GHz wireless system may be implemented in real-world operating environments.

For example, challenges arise from weather conditions and the practical deployment of the system in telecom operations. Some example integrated circuits (ICs) may be built for IEEE 802.11ad/ay WiGig standards, and it is important to test them against telecom requirements. Some example systems and devices, including baseline and updated silicon implementations, may be subjected to challenging conditions. Once proven, example technology described herein may play a major role in 5G deployments and beyond, as networks evolve to support high cell density use cases and applications.

In some example embodiments, advanced 60 GHz wireless technology may be leveraged for a seamless 5G fronthaul solution. This approach may utilize integrated circuits to deliver high-throughput, reliable fronthaul transmissions, effectively reducing or eliminating the need for extensive fiber installations. Some example chip design capabilities may achieve 25 Gbps (or higher or lower) with a sufficient link budget margin to compensate for rain and weather losses. This strategy may significantly reduce deployment time and costs, offering a scalable and flexible alternative to traditional fiber-based networks.

FIG. 1 is a functional block diagram of an example communication system 100 including a 60 GHz wireless fronthaul. For example, 60 GHz wireless technology may be integrated within a 5G O-RAN architecture. This may enable operators to replace the eCPRI link between the RU and the DU with a wireless link, offering significant flexibility in installation and reducing the constraints posed by traditional fiber connections.

As shown in FIG. 1, the communication system 100 includes a core network 102, a computing unit (CU) 104 electrically coupled with the core network 102, and a distributed unit (DU) 106 electrically coupled with the computing unit 104. A radio unit (RU) 108 is electrically coupled with one or more antennas 112, which may be cellular antennas configured to receive cellular or other types of communication signals.

The radio unit 108 is configured to communicate with the distributed unit 106 via a wireless communication connection 114. The wireless communication connection 114 may use a frequency of 60 GHz (or higher or lower), as describe further herein. The wireless communication connection 114 may be a wireless link which serves as a 5G fronthaul, to transport data between the radio unit 108 and the distributed unit 106.

In some examples, the communication system 100 may provide high data throughput, such as the 60 GHz wireless technology supporting data rates up to 25 Gbps, ensuring high-speed data transmission suitable for 5G fronthaul requirements. The communication system 100 may facilitate beamforming capabilities, such as incorporating an antenna array (e.g., eight element array, sixteen element array, thirty-two element array, etc.), for precise beamforming, improved signal directionality, and reduced interference/jamming.

In some examples, the communication system 100 may be compact and scalable, where the 60 GHz system features a compact design that can be easily scaled by adding more array antennas to increase capacity. The communication system 100 may provide low latency, designed to meet the critical latency requirements of 5G networks, ensuring seamless communication between the radio unit (RU) and the distributed unit (DU).

The communication system 100 may reduce or eliminate cabling requirements (due to the wireless communication connection 114), which may provide cost reductions by reducing or eliminating the need for expensive fiber cabling, significantly reducing installation and maintenance costs. The communication system 100 may allow for flexible installation locations, removing the spatial limitations associated with wired connections. This is especially beneficial in urban environments where cabling can be a logistical challenge.

In some examples, the communication system 100 may facilitate ease of deployment, by allowing for rapid installation due to wireless links being set up much faster than wired connections, enabling quicker deployment of 5G networks. This may also reduce infrastructure, by reducing or minimizing the need for extensive physical infrastructure, simplifying the deployment process and reducing the overall footprint.

The communication system 100 may provide enhanced network reliability, with resilience to environmental conditions. For example, advanced beamforming and MIMO capabilities may ensure consistent performance even under varying environmental conditions. Wireless links such as the wireless communication connection 114 may provide redundancy to wired connections, enhancing overall network reliability and uptime.

In some examples, the communication system 100 may improve network performance, such as by supporting high data throughput to ensure that the network can handle the increased traffic demands of 5G applications. The communication system 100 may provide low latency, to meet stringent latency requirements of 5G and ensure real-time communication and responsiveness.

The communication system 100 may provide a scalable solution where the system can be easily scaled by adding more phased array antennas, accommodating future network expansion. The communication system may also be adaptable, such as integrating the system into various network architectures, supporting both centralized and decentralized deployment models. The communication system 100 may provide regulatory and licensing advantages, such as license-free operation where the 60 GHz band does not require a spectrum license, allowing for quicker and more flexible deployment without regulatory delays.

Figure 2:
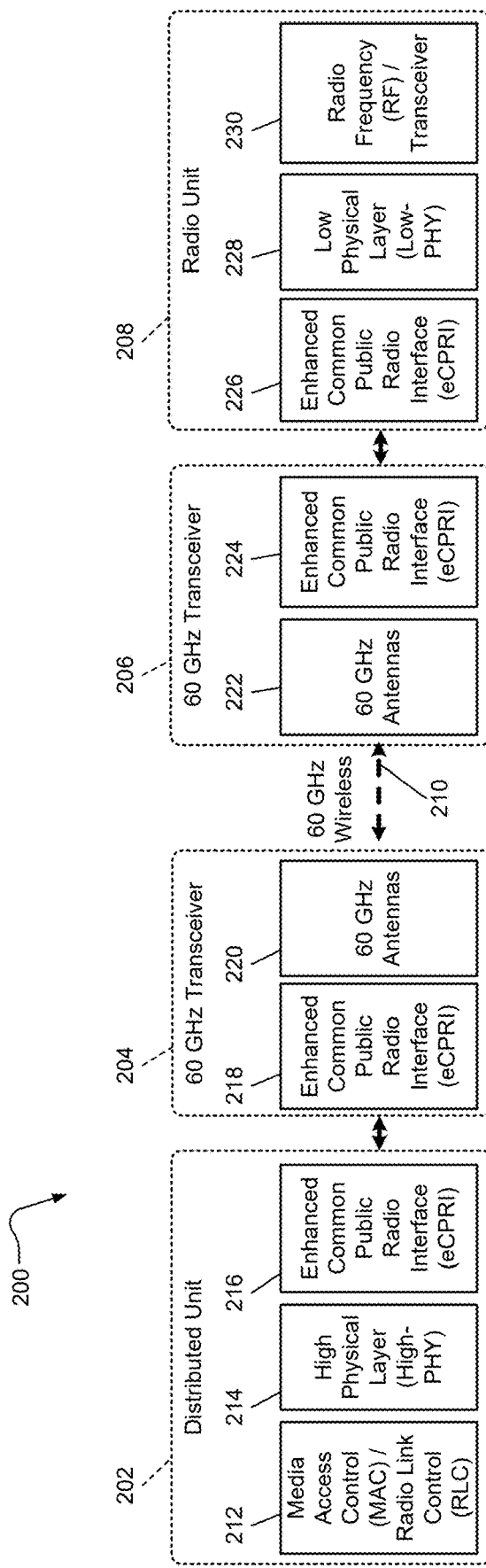
FIG. 2 is a functional block diagram of an example architecture of the 60 GHz wireless fronthaul of the communication system of FIG. 1.

FIG. 2 is a functional block diagram of an example architecture of the 60 GHz wireless fronthaul of the communication system of FIG. 1. For example, a 60 GHz wireless fronthaul may be represented in an O-RAN Split 7.2 architecture. The fronthaul implementation may also include enhanced Common Public Radio Interface (eCPRI) interfaces on both ends, for seamless integration with the commercial RU and DU.

As shown in FIG. 2, the example architecture 200 includes a distributed unit 202 electrically coupled with a 60 GHz transceiver 204. A radio unit 208 is electrically coupled with another 60 Ghz transceiver 206. The first 60 GHz transceiver 204 may send data to, and receive data from, the second 60 GHz transceiver 206, via a 60 GHz wireless communication link 210.

The distributed unit 202 may include a media access control (MAC)/radio link control (RLC) 212, a high physical layer (High-PHY) 214, and an enhanced common public radio interface (eCPRI) 216. The eCPRI 216 may be configured to interface with an eCPRI 218 of the 60 GHz transceiver 204, to transfer data between the distributed unit 202 and the 60 GHz transceiver 204.

The 60 GHz transceiver 204 includes one or more 60 GHz antennas 220, which communicate with 60 GHz antennas 222 of the 60 GHz transceiver 206, via the 60 GHz wireless communication link 210. The 60 GHz transceiver 206 also includes an eCPRI 224 configured to transfer and receive data with an eCPRI 226 of the radio unit 208, to transfer data between the 60 GHz transceiver 206 and the radio unit 208. As shown in FIG. 2, the radio unit 208 may include a low physical layer (Low-PHY) 228 and a radio frequency (RF) transceiver 230 (e.g., for communicating with other devices, such via cellular signals).

In some examples, a target throughput for the communication system 100 is 25 Gbps. The communication system may use specified Modulation and Coding Scheme (MCS) modes for 802.11ad and 802.11ay communication protocols, with baseline and target throughput rates. For example, an SoC device may supports MCS 9 (or higher or lower), which under 802.11ad can support up to 4.003 Gbps (or higher or lower). To reach a 25 Gbps target, a SoC device may be configured to support MCS12 (or higher or lower), capable of transferring data at 7.3292 Gbps (or higher or lower). Achieving MCS12 support may require doubling an RF bandwidth as specified by 802.11ay.

In some examples, a total throughput may exceed 29 Gbps (or higher or lower). The system may include support for WiGig standards, 802.11ay, and example SoC devices may support a highest data rate specified in 802.11ay, which is 7.392 Gbps. Furthermore, each SoC device may implement two radio channels, effectively doubling the data rate per SoC device to 14.784 Gbps (e.g., two times 7.392 Gbps).

Some example implementations may use two (or more) SoCs devices. By distributing the radio channels across four frequency bands, each SoC device may operate on two separate bands. This configuration significantly enhances the overall system capacity. The combined throughput of two example SoC devices, each supporting 14.784 Gbps, may result in a total expected throughput of 29.568 Gbps (or higher or lower).

Table 1 below provides example attributes for different SoC devices, with respect to total throughput. A multi-channel, multi-band approach may not only maximize data rates, but also improve link robustness and performance under various environmental conditions. By leveraging advancements in 802.11ay and the enhanced capabilities of example SoC devices described herein, a communication system may deliver unparalleled wireless fronthaul performance, supporting the demanding requirements of modern 5G networks.

TABLE 1

| Attribute | 1st Example SoC Device | 2nd Example SoC Device |
|---|---|---|
| WiGig Standard | 802.11ad | 802.11ay |
| MCS | 9 | 12 |
| Throughput per radio | 4.003 Gbps | 7.392 Gbps |
| Number of Radios per chip | 1 | 2 |
| Number of chips per link | 1 | 2 |
| Total Throughput | 4.003 Gbps | 29.568 Gbps |

Tables 2 and 3 below provide example assumed system parameters and values for link budget for 60 GHz fronthaul transmission, based on a coverage range of 500 meters. Given the current link margin and the potential to combine the phased array antenna with a horn antenna (as described further below), it may be possible to extend this range.

TABLE 2

| System Parameters | Values |
|---|---|
| Required SNR for MCS 12 | 18 dB |
| Receiver Noise Figure | 6 dB |
| Range | 500 m |
| Number of Tx antenna elements | 128 |
| Number of Rx antenna elements | 128 |
| Antenna gain per element | 10 dB |

Link budget calculations may be based on free space Line of Sight (LOS) transmission. This may account for signal attenuations due to rain and oxygen absorption. The SNR requirements are based on 802.11ad and ay specifications, as the example SoCs may be built to these standards. SNR requirements for 5G fronthaul may be higher. However, with an example link margin of 13 dB and the potential increased link margin from the combination of the phased array with a horn antenna, the overall link margin may be sufficient to accommodate environmental impairments and allow for an increased transmission range.

TABLE 3

| Link Budget Parameters | Values |
|---|---|
| Transmitter | |
| Output power per element | 7 dBm |
| Tx antenna gain per element | 10 dBi |
| # of Tx antenna elements | 128 |
| Tx EIRP | 59 dBm |
| Path Loss | |
| Free space loss | 123 dB |
| Rain and O2 attenuation | 8 dB |
| Receiver | |
| Rx antenna gain per element | 10 dBi |
| Beamforming gain | 23 dB |
| Signal level upon beam combining | 3 dBm |
| Noise level upon beam combining | −28 dBm |
| SNR at the ADC input | 31 dB |
| Required SNR for MCS 12 | 18 dB |
| Link Margin | 13 dB |

Figure 3:
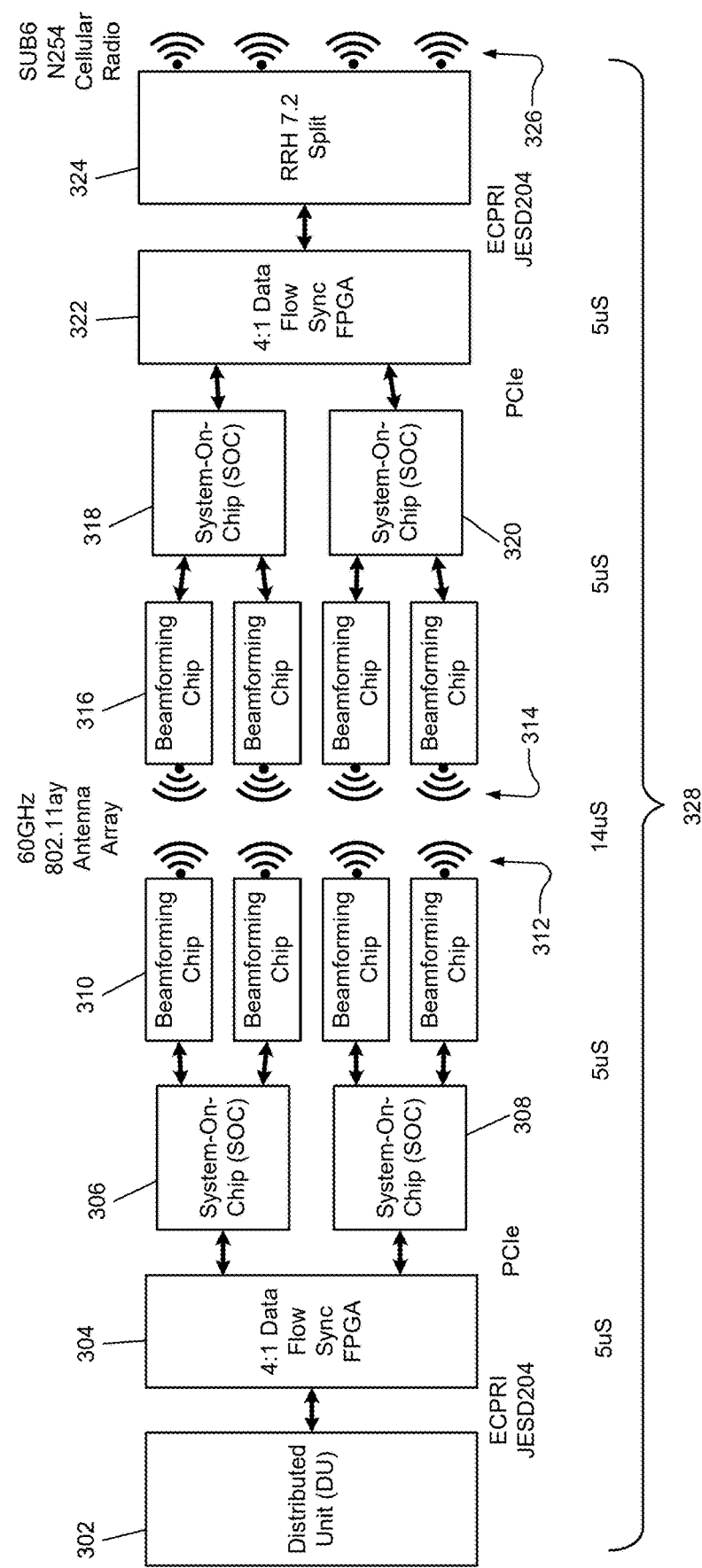
FIG. 3 is a functional block diagram illustrating example latency estimation in the 60 GHz wireless fronthaul of the communication system of FIG. 1.

FIG. 3 is a functional block diagram illustrating example latency estimation in the 60 GHz wireless fronthaul of the communication system of FIG. 1. In some examples, there may be three major contributors to the overall latency in the 60 GHz fronthaul subsystem. The first is the processing of the data from the RU, which may be distributed across multiple 60 GHz channels. This disseminated data on the transmitter end may also need to be aggregated on the receiver end. The second contributor is the processing latency through the SoC device(s), which also need be accounted for on both the transmitter and receiver sides. Additionally, there may be over-the-air (OTA) propagation latency. However, the OTA propagation latency may not be unique to the 60 GHz wireless transmission latency, as fiber transmission would incur a similar or slightly higher latency due to the fiber dielectric. Overall, the total latency impact of the 60 GHz fronthaul subsystem may be estimated to contribute a total of 24 microseconds in some example embodiments.

As shown in FIG. 3, a distributed unit 302 is electrically coupled with an FPGA 304 (e.g., a 4:1 data flow sync FPGA), which is electrically connected with two system-on-chip (SoC) devices 306 and 308. Each SOC device 306 and 308 is electrically coupled with two beamforming chips 310, which receive and transmit 60 GHz wireless communication signals via antennas 312.

An RRH 7.2 Split device (radio unit 324) includes multiple cellular antennas 326, and is electrically coupled with an FPGA 322. The FPGA 322 is electrically coupled with two SoC devices 318 and 320, which are each coupled with two beamforming chips 316. The beamforming chips 316 include antennas 314 for receiving and transmitting 60 GHz wireless communication signals.

A total latency 328 may be determined for the system, based on individual latency values at different components. For example, data processing by the radio unit 324 and distributed unit 302 may add five microseconds on each side (or more or less), and data processing by the SoC devices 306, 308, 318 and 320 may add five microseconds on each side (or more or less).

OTA propagation latency between the antennas 312 and the antennas 314 may provide, for example, 14 microseconds of latency (or more or less). In this example, the total latency 328 may be approximately 34 microseconds, although other example embodiments may have more or less latency.

Figure 4:
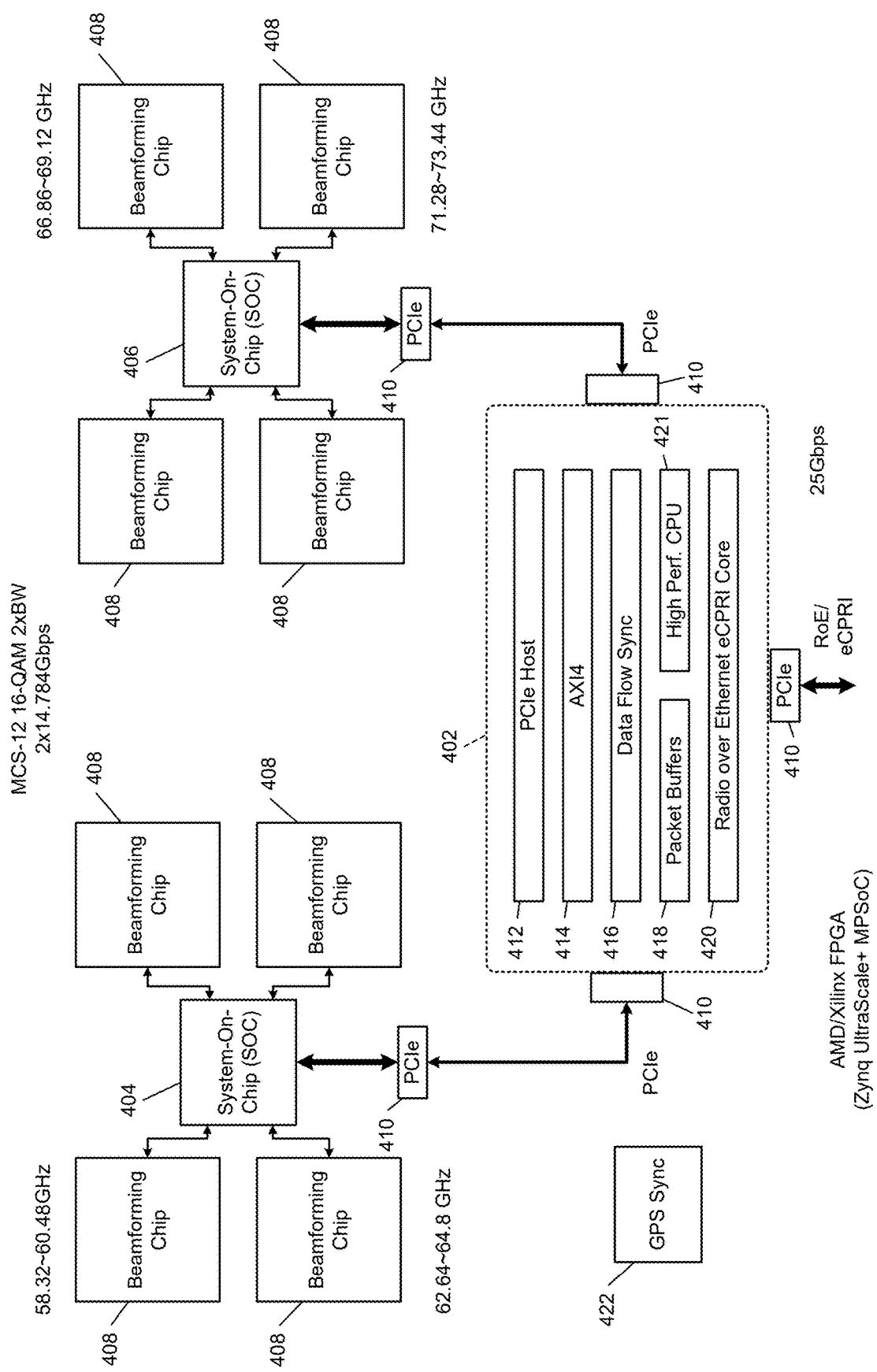
FIG. 4 is a functional block diagram of an example wireless fronthaul system including multiple beamforming chips and system-on-chip (SOC) devices.

FIG. 4 is a functional block diagram of an example wireless fronthaul system including multiple beamforming chips and system-on-chip (SOC) devices. As shown in FIG. 4, the example system includes a first SoC device 404 coupled with four beamforming integrated circuits 408, and a second SoC device 406 coupled with another four beamforming integrated circuits 408.

Each system-on-chip (SoC) device 404 and 406 may support advanced modulation and coding schemes (MCS) to achieve higher data rates. For example, each SoC device 404 and 406 may incorporate enhancements such as increased processing power and improved power efficiency, enabling it to handle the higher throughput demands of 25 Gbps (or higher or lower bandwidths).

Each beamforming integrated circuit (IC) 408 may be critical for directing a signal towards the desired receiver with high precision. Each beamforming IC 408 may be configured to support more antenna elements and advanced algorithms to improve beamforming accuracy and efficiency. This will help in achieving better signal quality and higher data rates by focusing the transmission power more effectively.

The beamforming ICs 408 may define one or more phased array antennas, which may include eight antenna elements, sixteen antenna elements, thirty-two antenna elements, etc. Each antenna element may be individually controlled for precise beamforming. This antenna configuration may be crucial for maintaining a stable and high-throughput link, even in challenging environments. The ability to dynamically steer the beam may enhance the adaptability of the communication system to changing conditions and obstacles.

An FPGA 402 may be configured to manage backhaul connectivity, by implementing the eCPRI (enhanced Common Public Radio Interface) protocol. This component may ensure efficient and low-latency communication between the radio units and the baseband processing unit. The FPGA may also facilitate seamless integration with existing network infrastructure, supporting the high data rates required for 5G fronthaul, As shown in FIG. 4, the FPGA 402 may include a PCIe host 412, a high performance CPU component 414, a data flow sync 416, packet buffers 418, an ARM cortex-A 421, a radio over ethernet (RoE) eCPRI core 420, and multiple PCIe interfaces 410. The system may also include a GPS sync 422.

Figure 5:
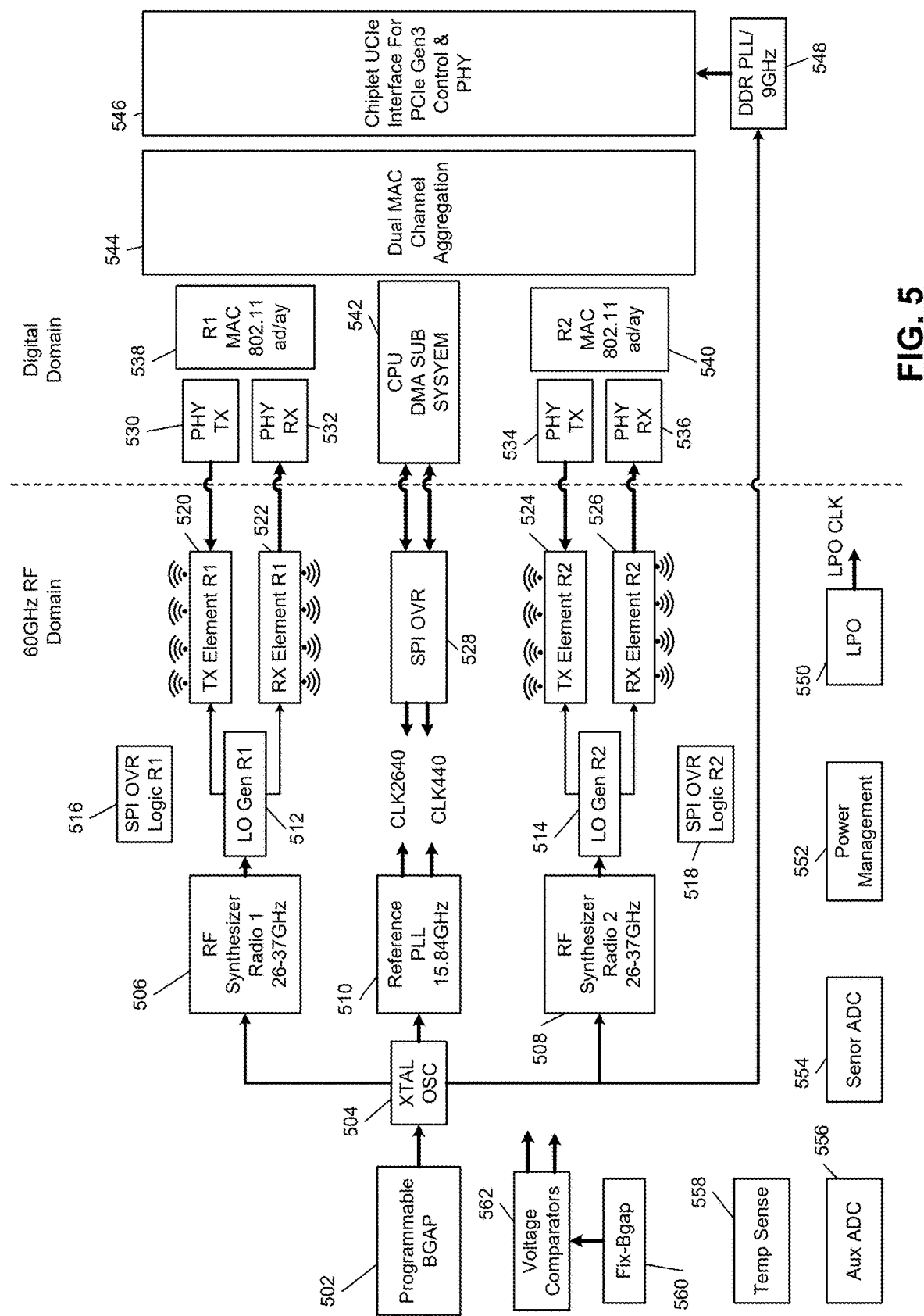
FIG. 5 is a functional block diagram of a system-on-chip (SOC) device of the communication system of FIG. 1.

FIG. 5 is a functional block diagram of a system-on-chip (SOC) device of the communication system of FIG. 1. On the left side of FIG. 5 is the 60 GHz RF domain, while the right side represents the digital domain. The eCPRI Radio over Ethernet (RoE) data is transmitted from the Backhaul eCPRI FPGA via the PCIe Gen3 interface.

In some example embodiments (and not necessarily in FIG. 5), upon entering the SoC system, RoE data is assigned a RoE Producer port linked to a Consumer port through DMA, with the dual Hardware MACs (HWMAC) acting as the consumers for the RoE data. Control communication channels between the Backhaul eCPRI device and the SOC device are established through dedicated PCIe Producer ports to CPU Consumer ports, and vice versa. Lower MAC handling is managed by the NANT2 processor, while the Upper MAC resides on the Backhaul eCPRI higher-end application processor.

Referring again to FIG. 5, a programmable bandgap circuit 502 provides a signal to a crystal oscillator 504, which is coupled with first and second RF synthesizer radios 506 and 508. The crystal oscillator 504 is also coupled with a reference phase-locked loop (PLL) circuit 510, and a DDR PLL circuit 548.

The first RF synthesizer radio 506 is coupled with a first local oscillator generator 512, which is connected with transmit antenna elements 520 and receive antenna elements 522. The second RF synthesizer radio 508 is coupled with a second local oscillator generator 514, which is connected with transmit antenna elements 524 and receive antenna elements 526.

The 60 GHz RF domain also includes a serial peripheral interface (SPI) overvoltage protection relay (OVR) circuit 528, first SPI OVR logic 516 and second SPI OVR logic 518. A linear-drive pluggable optics (LPO) circuit 550 is configured to generate a clock signal. The 60 GHz RF domain may include a power management circuit 552, a sensor analog-to-digital (ADC) converter 554, an auxiliary ADC 556, a temperature sensor 558, a fixed bandgap circuit 560, and voltage comparators 562.

On the digital domain side, a chiplet UCIe interface 546 is coupled to receive a signal from the DDR PLL circuit 548. The digital domain includes a dual MAC channel aggregation 544, and first and second MAC 802.11ad/ay circuits 538 and 540.

A first PHY transmitter 530 communicates with the transmit antenna elements 520, a first PHY receiver 532 communicates with the receive antenna elements 522, a second PHY transmitter 534 communicates with the transmit antenna elements 540, and a second PHY receiver 536 communicates with the receive antenna elements 526. The digital domain includes a CPU direct memory access (DMA) sub system 542, in communication with the SPI OVR circuit 528.

In some example dual radio and dual MAC/Modem configurations, various over-the-air traffic configurations are possible. The aggregation mode may be particularly useful as the incoming eCPRI stream is divided into two MAC/Modem/Radio channel streams using a ping-pong scheme. In this scheme, 802.11 frames are sent out in a round-robin manner based on which MAC can access the wireless medium.

For example, configuring both paths to the MCS-12 modulation rate allows each MAC to independently request MPDU payload from the shared memory space. Each MAC may operate independently, unaware of the other MAC's presence. The aggregation layer may handle synchronization between the two MACs, and reassembles the two independent MAC streams into a single eCPRI stream. An example initial aggregation reassembly algorithm may reorder out-of-order frames using 802.11 sequence numbers, committing only in-order frames to the next processing step and holding out-of-order frames until they can be reordered or a timeout occurs.

System-level considerations arise as wireless channel conditions vary, with rain being a significant factor for the 60 GHz frequency band. Channel degradations can increase the out-of-order frame arrival rate. To address this, the communication system may adapt to wireless channel conditions by reducing the MCS rate and reverting to the original MCS under improved conditions.

Some example embodiments may combine phased array antennas with horn antennas to provide significant advantages, particularly in mm Wave applications. While mm Wave antennas offer high gain in a compact form, their gain is often constrained by increased conductor losses (e.g., I2R losses) at higher frequencies. Space-fed systems, such as horn lens configurations, mitigate this issue by replacing cascaded power splitters with air.

As an example, monolithic microwave integrated circuit (MMIC) phase shifter technology may be combined with an offset reflector feed that supports phased array scanning. The reflector may be shaped using an artificial intelligence (AI) based stochastic optimizer that enhances the gain of a small array.

For example, an AI shaped dish may be fed by a small array. The dish may form beams with gains upwards of 20 dB (or more or less), with scanning of around 15 degrees (or more or less). Interference may be reduced using additive nulling to further improve carrier to interference ratios. The use of the shaped dish (or horn lens) technology reduces the system loss and cost relative to a larger array configuration.

Figure 6:
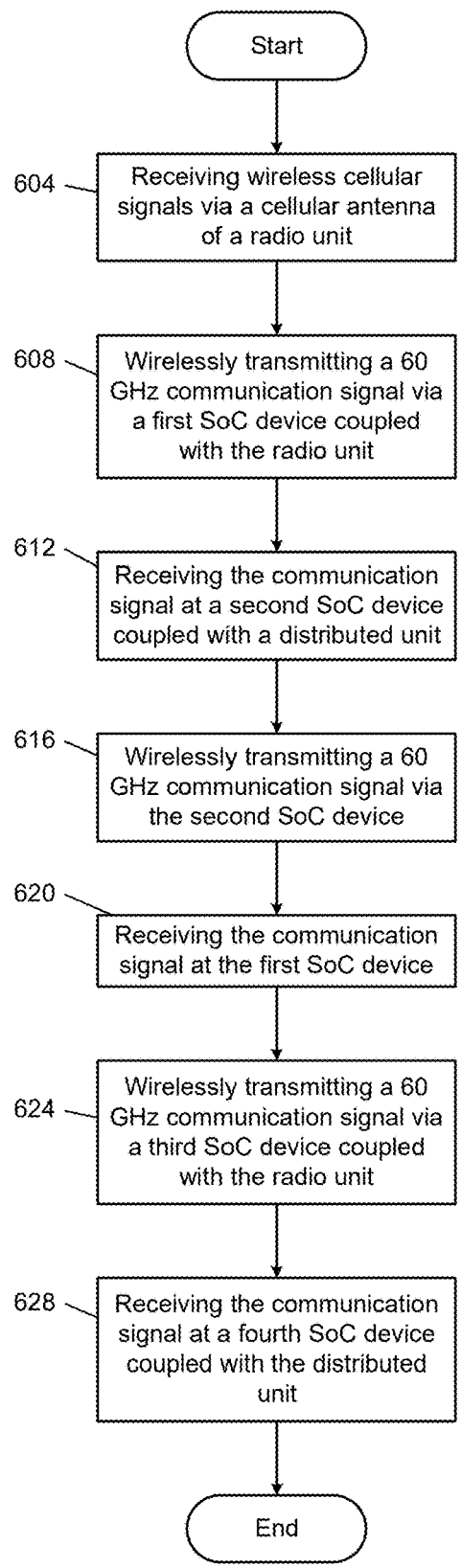
FIG. 6 is a flowchart depicting an example process of operating a communication system including a distributed unit of a fronthaul communication system architecture.

FIG. 6 is a flowchart depicting an example process of operating a communication system including a distributed unit of a fronthaul communication system architecture. The process begins at 604 by receiving wireless cellular signals via a cellular antenna of a radio unit.

At 608, the system wirelessly transmits a 60 GHz communication signal via a first SoC device electrically coupled with the radio unit. A second SoC device receives the wireless communication signal at 612. The second SoC device is electrically coupled with a distributed unit of the communication system.

At 616, the second SoC device wireless transmits a 60 GHz communication signal to the first SoC device. The first SoC device receives the communication signal at 620. In this manner, each of the first and second SoC devices may transmit signals to, or receive signals from, the other SoC device.

At 624, a third SoC device wireless transmits a 60 GHz communication signal. The third SoC device is electrically coupled with the radio unit. At 628, a fourth SoC device receives the communication signal transmitted by the third SoC device. The fourth SoC device is electrically coupled with the distributed unit. In this example, each of the radio unit and the distributed unit may be electrically coupled with multiple SoC devices, which can transmit wireless communication signals separate from one another. In some examples, the SoC devices are configured to wireless transmit the communication signals at a rate of at least 25 Gbps.

CONCLUSION

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. In the written description and claims, one or more steps within a method may be executed in a different order (or concurrently) without altering the principles of the present disclosure. Similarly, one or more instructions stored in a non-transitory computer-readable medium may be executed in different order (or concurrently) without altering the principles of the present disclosure. Unless indicated otherwise, numbering or other labeling of instructions or method steps is done for convenient reference, not to indicate a fixed order.

Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules) are described using various terms, including "connected," "engaged," "interfaced," and "coupled." Unless explicitly described as being "direct," when a relationship between first and second elements is described in the above disclosure, that relationship encompasses a direct relationship where no other intervening elements are present between the first and second elements, and also an indirect relationship where one or more intervening elements are present (either spatially or functionally) between the first and second elements.

The phrase "at least one of A, B, and C" should be construed to mean a logical (A OR B OR C), using a non-exclusive logical OR, and should not be construed to mean "at least one of A, at least one of B, and at least one of C." The term "set" does not necessarily exclude the empty set. The term "non-empty set" may be used to indicate exclusion of the empty set. The term "subset" does not necessarily require a proper subset. In other words, a first subset of a first set may be coextensive with (equal to) the first set.

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include processor hardware (shared, dedicated, or group) that executes code and memory hardware (shared, dedicated, or group) that stores code executed by the processor hardware.

The module may include one or more interface circuits. In some examples, the interface circuit(s) may implement wired or wireless interfaces that connect to a local area network (LAN) or a wireless personal area network (WPAN). Examples of a LAN are Institute of Electrical and Electronics Engineers (IEEE) Standard 802.11-2016 (also known as the WIFI wireless networking standard) and IEEE Standard 802.3-2015 (also known as the ETHERNET wired networking standard). Examples of a WPAN are IEEE Standard 802.15.4 (including the ZIGBEE standard from the ZigBee Alliance) and, from the Bluetooth Special Interest Group (SIG), the BLUETOOTH wireless networking standard (including Core Specification versions 3.0, 4.0, 4.1, 4.2, 5.0, and 5.1 from the Bluetooth SIG).

The module may communicate with other modules using the interface circuit(s). Although the module may be depicted in the present disclosure as logically communicating directly with other modules, in various implementations the module may actually communicate via a communications system. The communications system includes physical and/or virtual networking equipment such as hubs, switches, routers, and gateways. In some implementations, the communications system connects to or traverses a wide area network (WAN) such as the Internet. For example, the communications system may include multiple LANs connected to each other over the Internet or point-to-point leased lines using technologies including Multiprotocol Label Switching (MPLS) and virtual private networks (VPNs).

In various implementations, the functionality of the module may be distributed among multiple modules that are connected via the communications system. For example, multiple modules may implement the same functionality distributed by a load balancing system. In a further example, the functionality of the module may be split between a server (also known as remote, or cloud) module and a client (or, user) module. For example, the client module may include a native or web application executing on a client device and in network communication with the server module.

The term code, as used above, may include software, firmware, and/or microcode, and may refer to programs, routines, functions, classes, data structures, and/or objects. Shared processor hardware encompasses a single microprocessor that executes some or all code from multiple modules. Group processor hardware encompasses a microprocessor that, in combination with additional microprocessors, executes some or all code from one or more modules. References to multiple microprocessors encompass multiple microprocessors on discrete dies, multiple microprocessors on a single die, multiple cores of a single microprocessor, multiple threads of a single microprocessor, or a combination of the above.

Shared memory hardware encompasses a single memory device that stores some or all code from multiple modules. Group memory hardware encompasses a memory device that, in combination with other memory devices, stores some or all code from one or more modules.

The term memory hardware is a subset of the term computer-readable medium. The term computer-readable medium, as used herein, does not encompass transitory electrical or electromagnetic signals propagating through a medium (such as on a carrier wave); the term computer-readable medium is therefore considered tangible and non-transitory. Non-limiting examples of a non-transitory computer-readable medium are nonvolatile memory devices (such as a flash memory device, an erasable programmable read-only memory device, or a mask read-only memory device), volatile memory devices (such as a static random access memory device or a dynamic random access memory device), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. Such apparatuses and methods may be described as computerized apparatuses and computerized methods. The functional blocks and flowchart elements described above serve as software specifications, which can be translated into the computer programs by the routine work of a skilled technician or programmer.

The computer programs include processor-executable instructions that are stored on at least one non-transitory computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, JavaScript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

What is claimed is:

1. A communication system comprising:
    a distributed unit of a fronthaul communication system architecture, wherein the distributed unit is in communication with a core network of the communication system;
    a radio unit of the fronthaul communication system architecture, wherein the radio unit is electrically coupled with at least one cellular antenna, and the radio unit is configured to transmit and receive wireless cellular signals; and
    a wireless communication link between the distributed unit and the radio unit, wherein the wireless communication link includes:
        a first 12 nm system-on-chip (SoC) device;
        a first 4:1 field-programmable gate array (FPGA) electrically coupled between the radio unit and the first 12 nm SoC device;
        a second 12 nm SoC device;
        a second 4:1 FPGA electrically coupled between the distributed unit and the second 12 nm SoC device, wherein the second 4:1 FPGA is a backhaul enhanced common public radio interface (eCPRI) FPGA, the first 12 nm SoC device and the second 12 nm SoC device are configured to wirelessly transmit communication signals between the radio unit and the distributed unit at a frequency of at least sixty Gigahertz, and the second 12 nm SoC device includes a peripheral component interconnect express (PCIe) interface configured to receive enhanced common public radio interface (eCPRI) Radio over Ethernet (RoE) data from a backhaul eCPRI field-programmable gate array (FPGA);
        first and second beamforming chips electrically coupled with the first 12 nm SoC device; and
        third and fourth beamforming chips electrically coupled with the second 12 nm SoC device, wherein the first and second beamforming chips are configured to wireless transmit communication signals with the first and second beamforming chips.

2. The communication system of claim 1, wherein the wireless communication link includes an antenna array configured to transmit signals using beamforming, and the antenna array includes the first, second, third and fourth beamforming chips.

3. The communication system of claim 2, wherein the antenna array includes at least eight antenna elements.

4. The communication system of claim 2, wherein the antenna array is configured to operate according to a multiple input, multiple output communication arrangement.

5. The communication system of claim 2, wherein the antenna array is configured to transmit signals between the radio unit and the distributed unit according to at least one of an IEEE 802.11ay communication protocol or an IEEE 802.11ad communication protocol.

6. The communication system of claim 1, wherein the wireless communication link is configured to transmit signals between the radio unit and the distributed unit with a latency of less than fifty microseconds.

7. The communication system of claim 1, wherein the wireless communication link is configured to transmit data at a rate of at least 25 Gbps.

8. The communication system of claim 1, wherein the radio unit is configured to transmit and receive 5G cellular network signals.

9. The communication system of claim 1, wherein the distributed unit is not connected with the radio unit via a physical wire connection.

10. The communication system of claim 1, further comprising at least one fiber cable coupled between the distributed unit and the core network to transmit communication signals between the distributed unit and the core network.

11. The communication system of claim 1, wherein the wireless communication link is configured to transmit signals between the radio unit and the distributed unit using time-division multiple access (TDMA) and carrier sense multiple access collisional avoidance (CSMA/CD) communication protocols.

12. The communication system of claim 1, wherein the wireless communication link is configured to transmit signals between the radio unit and the distributed unit at a distance of at least one kilometer.

13. The communication system of claim 1, wherein:
the first 12 nm SoC device is electrically coupled with the radio unit via a first enhanced common public radio interface (eCPRI); and
the first 12 nm SoC device is electrically coupled with the distributed unit via a second eCPRI.

14. The communication system of claim 1, further comprising:
a third 12 nm SoC device electrically coupled with the radio unit; and
a fourth 12 nm SoC device electrically coupled with the distributed unit, wherein the third 12 nm SoC device and the fourth 12 nm SoC device are configured to wirelessly transmit communication signals between the radio unit and the distributed unit at a frequency of at least sixty Gigahertz.

15. The communication system of claim 1, wherein:
the first 12 nm SoC device is electrically connected with four beamforming integrated circuits including the first and second beamforming chips; and
the second 12 nm SoC device is electrically connected with four beamforming integrated circuits including the third and fourth beamforming chips.

16. A method of operating a communication system including a distributed unit of a fronthaul communication system architecture, and a radio unit of the fronthaul communication system architecture, wherein the radio unit electrically is coupled with at least one cellular antenna, the method comprising:
receiving, by the radio unit, wireless cellular signals via the at least one cellular antenna;
wirelessly transmitting, via a first 12 nm system-on-chip (SoC) device, a communication signal at a frequency of at least sixty Gigahertz, wherein a first 4:1 field-programmable gate array (FPGA) is electrically coupled between the radio unit and the first 12 nm SoC device; and
receiving, by a second 12 nm SoC device electrically, the communication signal transmitted by the first 12 nm SoC device, wherein,
a second 4:1 FPGA is electrically coupled between the distributed unit and the second 12 nm SoC device,
the second 4:1 FPGA is a backhaul enhanced common public radio interface (eCPRI) FPGA,
the second 12 nm SoC device includes a peripheral component interconnect express (PCIe) interface configured to receive enhanced common public radio interface (eCPRI) Radio over Ethernet (RoE) data from a backhaul eCPRI field-programmable gate array (FPGA),
first and second beamforming chips are electrically coupled with the first 12 nm SoC device,
third and fourth beamforming chips are electrically coupled with the second 12 nm SoC device, and
the first and second beamforming chips are configured to wireless transmit communication signals with the first and second beamforming chips.

17. The method of claim 16, wherein the communication signal is a first communication signal, and the method further comprises:
wirelessly transmitting, via the second 12 nm SoC device, a second communication signal at a frequency of at least sixty Gigahertz; and
receiving, by the first 12 nm SoC device, the second communication signal transmitted by the second 12 nm SoC device.

18. The method of claim 16, wherein wireless transmitting the communication signal includes wireless transmitting the communication signal at a rate of at least 25 Gbps.

19. The method of claim 16, wherein the communication signal is a first communication signal, a third 12 nm SoC device is electrically connected with the radio unit, a fourth 12 nm SoC device electrically is connected with the distributed unit, and the method further comprises:
wirelessly transmitting, via a third 12 nm SoC device, a second communication signal at a frequency of at least sixty Gigahertz; and
receiving, by the fourth 12 nm SoC device, the second communication signal transmitted by the third 12 nm SoC device.

\* \* \* \* \*